United States Patent [19]

Kavchok et al.

[11] Patent Number: 4,477,370

[45] Date of Patent: Oct. 16, 1984

[54] DEFOAMING COMPOSITION

[75] Inventors: Ronald W. Kavchok, Belle Mead; Francis J. Boylan, Newton, both of N.J.

[73] Assignee: Drew Chemical Corporation, Boonton, N.J.

[21] Appl. No.: 485,215

[22] Filed: Apr. 15, 1983

[51] Int. Cl.$^3$ ............................................. B01D 19/04
[52] U.S. Cl. .................................... 252/321; 252/358
[58] Field of Search ............................... 252/321, 358

[56] References Cited

U.S. PATENT DOCUMENTS

| | | | |
|---|---|---|---|
| 3,076,768 | 2/1963 | Boylan | 252/358 |
| 3,673,105 | 6/1972 | Curtis et al. | 252/358 |
| 3,697,442 | 10/1972 | Lieberman | 252/321 |
| 3,923,683 | 12/1975 | Michalski et al. | 252/321 |
| 4,009,119 | 2/1977 | Poschmann et al. | 252/358 |
| 4,032,473 | 6/1977 | Berg et al. | 252/358 |
| 4,107,073 | 8/1978 | Maciaszek | 252/321 |
| 4,303,549 | 12/1981 | Boylan | 252/321 |
| 4,340,500 | 7/1982 | Boylan | 252/321 |
| 4,341,656 | 7/1982 | Abel | 252/321 |

FOREIGN PATENT DOCUMENTS 2038793  7/1980  United Kingdom .

*Primary Examiner*—Richard D. Lovering
*Assistant Examiner*—Anne Brookes
*Attorney, Agent, or Firm*—Walter H. Schneider

[57] ABSTRACT

A synergistic, aqueous, free flowing defoaming composition comprising as the primary component an aqueous hydrophobic dispersion of an alcohol of 14–28 carbon atoms, a fatty acid of 14–28 carbon atoms, a soap of a fatty acid of 14–28 carbon atoms and a nonionic or anionic surfactant, and as a secondary component a dispersion of a hydrophobic solid in a water insoluble organic liquid.

3 Claims, No Drawings

DEFOAMING COMPOSITION

BACKGROUND OF THE INVENTION

1. Field of the Invention

The present invention relates generally to the problem of defoaming encountered in many industrial chemical processes. More particularly, the present invention relates to a composition for use in suppressing and controlling foam in such chemical processes. Still more particularly, the present invention relates to a defoaming composition particularly adapted for use in industrial chemical processes in which a high concentration of surfactant is employed rendering existing defoaming compositions less than acceptably effective.

2. Description of the Prior Art

Foaming is a constant problem in various industrial chemical processes such as, for example, the sulfite, sulfate and soda processes used in the pulp and paper industry for pulping wood chips, the stripping of monomers in the manufacture of synthetic elastomers and other polymeric products, the discharge of effluent streams in various industries, and the like. Numerous methods and means have been proposed for combating this problem in these and other industries where foaming occurs, including the use of various types of defoaming compositions. One class of defoaming composition that has proved to be quite successful comprises the suspension of a hydrophobic solid in a water-insoluble vehicle. U.S. Pat. No. 3,076,768, for instance discloses the use of a minor proportion of silica which has been treated with a dimethylpolysiloxane oil to render its surface hydrophobic, dispersed in a major proportion of any of various water-insoluble organic liquids such as chlorinated and non-chlorinated naphthenic and paraffinic mineral oils. U.S. Pat. No. 3,671,460 suggests similarly treating a hydrophilic alumina monohydrate with a liquid polysiloxane oil and then incorporating the resultant hydrophobic alumina in a water-insoluble vehicle such as an aliphatic, acyclic or aromatic hydrocarbon, or mixtures thereof, to form a dispersion in which the hydrophobed alumina is in a minor proportion to the hydrocarbon vehicle.

Still other defoaming compositions comprising a hydrophobic solid dispersed in a water insoluble organic liquid are disclosed in other patents. For example, in U.S. Pat. No. 3,652,453, a hydrophobic reaction product of a polyamine, such as ethylene diamine, and a fatty acid, such as stearic acid, is treated to form a melt which is then incorporated in a water insoluble organic liquid vehicle such as mineral oil, any of various alcohols, or the like. U.S. Pat. No. 3,673,105 also discloses the use of a polyamide fatty acid reaction product, such as ethylene bis-stearamide, dispersed as the hydrophobic solid in a paraffin mineral oil, or other suitable inert liquid hydrocarbon. The use of both hydrophobic silica and a bis-amide in a water insoluble organic liquid such as silicone oil or in an aqueous medium are shown in U.S. Pat. Nos. 3,923,683 and 4,107,073. Numerous other patents show various modifications to these several types of defoaming compositions.

Another class of defoaming composition that has enjoyed considerable success is a solid mixture comprising a linear alcohol of high carbon content, a saturated fatty acid, and a fatty acid soap in which the alcohol and acid are hydrophobic, such as disclosed in Canadian Pat. No. 534,604. Because it is desirable in many situations to have a free flowing composition that can be pumped directly from its place of storage to the point of application, it was proposed to form an aqueous dispersion of the composition as disclosed in U.S. Pat. No. 4,340,500. In the preparation of an aqueous defoaming composition of this type, a surfactant is employed to emulsify the alcohol and fatty acid in the water at temperatures above their melting points. The soap can be prepared in situ, if desired, from a portion of the fatty acid content by incorporating a suitable soap forming amine after the emulsion has been cooled. A further modification of this free flowing aqueous defoaming composition containing hydrophobic alcohol and fatty acid components is disclosed in U.S. Pat. No. 4,303,549 which teaches the introduction of suitable water soluble metal salt e.g., alum, into the dispersion to provide hydrophobic particle surfaces.

While these aqueous free flowing alcohol-fatty acid-soap defoaming compositions have proved to be quite successful in commercial application, they have a drawback in that their effectiveness decreases markedly as the surfactant concentration of the system being treated increases. Accordingly, ever increasing quantities of defoaming composition, disproportionate with respect to what might be expected for the degree of increase in the surfactant concentration of the system being treated, must be employed as the surfactant concentration increases in order to obtain an acceptable level of foam suppression and control. Accordingly, not only does it become more difficult to control foam under conditions of high surfactant concentration, it also becomes, at the same time, economically more unattractive.

SUMMARY OF THE INVENTION

There has continued to remain, therefore, a need for a defoaming composition that is not subject to this drawback. It is a principal object of this invention to fulfill this need. It is a further object of this invention to provide a defoaming composition having an improved capability for suppressing and controlling foam. It is a still further object of this invention to provide a defoaming composition that is particularly effective in systems in which the problem of foam is aggravated by high concentrations of surfactants. Another object of this invention is to provide a defoaming composition that can be readily applied to any industrial chemical process in which foaming is a problem, as well as in other areas in which foam occurs and must be suppressed and controlled. Still another object of this invention is to provide an improved process for controlling foam in all areas in which it occurs employing the defoaming composition of this invention.

The several objects of this invention have been met by a free flowing defoaming composition the primary component of which is a defoamer of the type comprising an aqueous dispersion of an alcohol, fatty acid and fatty acid soap as taught in U.S. Pat. Nos. 4,340,500 and 4,303,549. As a secondary component, the free flowing aqueous defoaming composition of this invention has incorporated therein a defoamer of the type comprising a hydrophobic solid material dispersed in a water insoluble and inert organic liquid, examples of which are disclosed in the various patents referred to and discussed above. It should be understood that no claim is made that either of the two types of defoamers forming the two components of the present defoaming composition is new, both types having been acknowledged hereinabove as previously known. Nor is any claim made that the use of either of these known types of defoamers by itself for the purpose of suppressing and controlling foam is novel, such use also having been acknowledged hereinabove as previously known. What is claimed as new, however, is the described defoaming composition containing as components these known types of defoamers and the use of the composition for the purpose of suppressing and controlling foam. In this respect, it has been quite surprisingly found that the defoaming composition as described has revealed a totally unexpected synergistic effect which renders the composition far more effective in suppressing and controlling foam in systems in which the results obtained by using either component by itself in corresponding amounts prove not as effective and in many situations unacceptable.

DESCRIPTION OF THE PREFERRED EMBODIMENT

The scope of the constituents of the primary component of the aqueous defoaming composition of this invention and its process of preparation are fully disclosed in U.S. Pat. Nos. 4,303,549 and 4,340,500. In accordance with that disclosure, there is provided a free flowing aqueous defoaming composition comprising (a) water, (b) at least one alcohol, (c) at least one fatty acid, (d) a soap of at least one fatty acid, and (e) a nonionic and/or anionic surfactant. Additionally, the composition may have added hereto a water soluble metal salt for reacting with a portion of the fatty acid content so as to provide hydrophobic surfaces.

The alcohol constituent of the primary component of the defoaming composition is a higher aliphatic alcohol of 14 to 28 carbon atoms. The alcohol may be a mixture of alcohols and may contain one or more hydroxyl groups as well as groups other than hydroxyl groups. Thus, the alcohol may be a partial ester of glycerin, e.g., glycerine monostearate. The preferred alcohols in accordance with the above identified patent disclosure are hydrocarbon alcohols of 16 to 18 carbon atoms. The fatty acid constituent of the primary constituent, like the alcohol constituent, is a higher aliphatic of the same range of carbon atoms, i.e., 14 to 28 carbon atoms, and preferably 16 to 18 carbon atoms. The fatty acid soap constituent may be formed from a similar acid to that just described and, preferably, is formed in situ from a portion of the fatty acid content by the addition of an alkali metal or amine soap, e.g., triethanolamine, to a mixture of the alcohol and the fatty acid.

The three above defined constituents of the primary component of the defoaming composition are dispersed in the water vehicle so as to provide a dispersed solids content of about 5 to 30% by weight, preferably in the range of 20 to 30% by weight. The individual constituents are present in the dispersion so as to provide a ratio of fatty acid to alcohol of from 0.2:1 to 0.4:1 by weight, and a ratio of fatty acid soap to alcohol of 0.1:1 to 0.5:1.

The primary component of the defoaming composition of this invention also contains a surfactant whose function is to prevent the formation of gelled mass of the solids content. Any of numerous nonionic and anionic commercially available surfactants may be employed for this purpose. A preferred nonionic surfactant is an ethylene condensation product containing more than two, preferably more than five ethylene oxide groups, with at least one end group thereof being terminated by condensation with an alcohol or a long chain fatty acid. The anionic surfactant may be widely varied and may be, for example, a sulfate or sulfonate of various alcohols, phenols, naphthalenes, and the like. The surfactant will be present in the dispersion usually in a ratio to the total alcohol, fatty acid, fatty acid soap content of from 0.1:1 to 0.4:1 parts by weight.

The aqueous primary component of the present defoaming composition is prepared by emulsifying the alcohol and fatty acid together with the surfactant in the aqueous vehicle at a temperature above the melting point of the solids. The resultant mixture is then cooled and, with high agitation, the addition of the soap forming component is made until the dispersion is homogenous. As earlier stated, a metal salt may be incorporated in the dispersion to react with a part of the fatty acid so as to provide hydrophobic surfaces. This incorporation, e.g., of alum, may be made at this time.

The secondary component of the defoaming composition of this invention comprises a hydrophobic solid dispersed in a water insoluble and inert organic liquid. Numerous compositions coming within this definition are commercially available and are used successfully by themselves as defoamers in many applications. The vehicle in which the hydrophobic solid is dispersed may be any liquid aliphatic, acyclic or aromatic hydrocarbon or mixtures thereof containing at least six carbon atoms. Mineral oils, silicone oils, polypropylene glycol, liquid fatty acids are just a few examples of the vehicles that have and are being used in commercial practice. Vehicles regularly used commercially are mineral oils and silicone oils, although the composition of the present invention may be practiced whatever the vehicle constituent of the secondary component may be.

As with the liquid vehicle constituent, the hydrophobic solid constituent of the secondary component may be widely varied and may be either a naturally hydrophobic material or a naturally hydrophilic material made hydrophobic by suitable treatment. Various normally hydrophilic materials such as silica, calcium carbonate, talc, calcium hydroxide, alumina monohydrate and aluminum silicates, to name a few, have been and are being used commercially as the finely divided hydrophobic solid after having been treated, for example, with a liquid hydrophobic siloxane oil to make them hydrophobic. Also regularly used commercially as the hydrophobic solid constituent are naturally hydrophobic materials such as various bisamides obtained by the reaction of a polyamide with a solid fatty acid or mixtures thereof. A bisamide that has found wide acceptance as the solid component of commercial compositions of the type forming the secondary component of the present defoaming composition is the reaction product of ethylene diamine and stearic acid, i.e., ethylene bis-stearamide. The procedures for hydrophobing normally hydrophilic solid materials for use in the secondary component, procedures for forming naturally hydrophobic solid materials such as bisamides, and the procedures used for incorporating a hydrophobic solid material in a water insoluble organic liquid are all well known and within the skill of the art to which this invention relats and, accordingly, need not be further pursued here particularly since they form no part of the present invention.

In the practice of the present invention, the content of the secondary component in the defoaming composition may vary over a wide range. As the concentration of the secondary component increases, the effectiveness of the defoaming composition increases. Such increased effectiveness, however, is accompanied by an increase in viscosity of the composition as well as an increase in the unit cost of the composition, both of which increases have their obvious drawbacks. The concentration of the secondary component, therefore, usually will not exceed about 7% on the weight of the composition. This concentration, on the other hand, may be as low as 0.5% on the weight of the composition. More usually, however, the concentration will be on the order of 1.5% to 3.5% on the weight of the defoaming composition, the particular concentration in any particular situation depending upon the composition of the secondary component and the application to be made of the defoaming composition. In preparation of the defoaming composition according to this invention, the two components are brought together and mixed by any means suitable to form a reasonably storage stable, pumpable, homogenous mixture.

The present invention is illustrated by the following Examples in which all parts are by weight unless otherwise noted.

EXAMPLE 1

Preparation of Primary Component

A primary component for use in the defoaming composition according to this invention was prepared using the following components:

| Component | Parts |
| --- | --- |
| ALFO 20+ (a mixture of $C_{18}$ to $C_{28}$ alcohols). A product of Conoco Chemicals Company. | 34.95 |
| Industrene 3022 (a mixture of $C_{14}$ to $C_{22}$ fatty acids). A product of Humko-Sheffield Chemical Company. | 12.72 |
| I GEPAL CO 710 (10-11 ethylene oxide adduct of nonyl phenol) A product of GAF. | 7.83 |
| Deionized water. | 240.00 |
| Triethanolamines. | 4.50 |

The alcohol, fatty acid and surfactant were emulsified in the water at 65° C., followed by cooling to 30° C. with high agitation, after which the triethanolamine was added with continued agitation until the mixture was homogeneous.

EXAMPLE 2

Preparation of the Secondary Component Silicone Oil/Silica

To 81 parts of silicone oil were added with agitation 9 parts of silica previously treated to make its surface hydrophobic, and 10 parts of an ethoxylated fatty acid as a surfactant. Agitation was continued until a lump free mixture of hydrophobic silica in silicone oil was obtained, after which the mixture was milled to an average particle size less than 40-50 microns.

EXAMPLE 3

Preparation of the Secondary Component Mineral Oil/Silica

To 89.4 parts of mineral oil were added with agitation 10.6 parts of silica previously treated to make its surface hydrophobic and agitation continued until a lump free mixture was obtained which was milled to an average particle size less than 40 microns.

EXAMPLE 4

Preparation of the Secondary Component Mineral Oil/Ethylene bis-Stearamide 20 parts of mineral oil and 5 parts of ethylene bis-stearamide were heated at 350°–400° F. to produce a hot melt. The resultant slurry was then added with agitation to 75 parts of mineral oil until a homogenized mixture of ethylene bis-stearamide in mineral oil was obtained.

EXAMPLE 5

Preparation and Use of the Defoaming Composition

The secondary components of Examples 2–4 were mixed with the primary component of Example 1 in proportions according to Tests 3–6 incl. of Table I. The resultant compositions were then tested for effectiveness as defoamers in a synthetic wood pulp black liquor having the following composition:

| Component | Parts by Wt. |
| --- | --- |
| Deionized water | 87.3 |
| Sodium carbonate | 5.0 |
| Sodium sulfate | 0.2 |
| Sodium lignin sulfonate | 7.0 |
| Sodium hydroxide | 0.3 |
| Tall oil fatty acid | 0.2 |

The test was conducted by dispersing 10 parts of the above synthetic black liquor in 500 parts of deionized water in each of six 100 ml stoppered graduates. To each of four of the graduates was added 50 microliters of a composition according to this invention, each having a primary component and a secondary component as indicated by Tests 3–6 incl. of the Table I. To one (Test 1) of the remaining two graduates was added 48.5 microliters of the primary component of Test 3, thereby reproducing the primary component of Test 3 as a separate test. To the other remaining graduate (Test 2) was added 1.5 microliters of the secondary component of Test 3, thereby reproducing the secondary component of Test 3 as a separate test. To determine the foam suppression and control effectiveness, each graduate was shaken vigorously ten times in a vertical direction after which the volume of foam was measured after 10 seconds. The results appear in Table I.

TABLE I

| Test No. | Vol. (Microliters) | Primary Component Ex 1 (Pts. by wt.) | Secondary Component Ex 2 (Pts. by wt.) | Ex 3 | Ex 4 | Foam Vol. (ml) |
| --- | --- | --- | --- | --- | --- | --- |
| 1 | 48.5 | 97 | | | | 140 |
| 2 | 1.5 | | 3 | | | 100 |
| 3 | 50 | 97 | 3 | | | 30 |
| 4 | 50 | 98 | 2 | | | 55 |
| 5 | 50 | 97 | | 3 | | 40 |
| 6 | 50 | 97 | | | 3 | 50 |

The results of Table I clearly illustrate the unusual effectiveness of the defoaming compositions according to this invention as represented by Test 3–6 incl. in suppressing and controlling foam in high surfactant systems. The surprising and unexpected synergism exhibited by the compositions of the invention is illustrated by comparing the results of Test 3 against those of Test 1 and 2 in which the primary and secondary components, respectively, of Test 3 were separately tested.

In practicing the present invention, the defoaming composition is used in an amount to be effective in the system being treated taking into consideration the nature of the system as well as of the particular defoaming composition being employed. The selection of an appropriate amount will generally not be in excess of 100 ppm of the composition, the determination of the exact amount in each instance being within the scope of those skilled in the art.

Reference in the disclosure to details of the specific embodiments described is not intended to restrict the scope of the appended claims which themselves recite those features regarded as essential to the invention.

We claim:

1. An aqueous, free flowing defoaming composition comprising as the primary component a 5–30% aqueous hydrophobic dispersion of a solid alcohol of 14–28 carbon atoms, a solid fatty acid of 14–28 carbon atoms, a soap of a solid fatty acid of 14–28 carbon atoms and a nonionic or anionic surfactant, the ratio by weight of acid and soap to alcohol being 0.2–0.4:1.0 and 0.1–0.5:1.0, respectively, and the ratio by weight of surfactant to combined alcohol, acid and soap being 0.1–0.4:1.0; and as the secondary component a dispersion of finely divided hydrophobic silica or ethylene-bis-stearamide in a water insoluble organic liquid, said primary and secondary components being present in a ratio by weight of the composition of 93–99.5% and 7.0–0.5%, respectively.

2. A composition according to claim 1 in which the primary component is present in an amount of 96.5% to 98.5% and the secondary component is present in an amount of 3.5% to 1.5% on the weight of the composition.

3. A method for defoaming a foamable system which comprises adding to the system an effective amount of a composition according to claim 1.

* * * * *